(12) United States Patent
Gallagher et al.

(10) Patent No.: US 8,638,500 B2
(45) Date of Patent: Jan. 28, 2014

(54) TWO-STAGE OPTICAL OBJECT MOLDING USING PRE-FINAL FORM

(75) Inventors: Dennis J. Gallagher, Boulder, CO (US); Regis S. Fan, Westminster, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 185 days.

(21) Appl. No.: 13/024,265

(22) Filed: Feb. 9, 2011

(65) Prior Publication Data

US 2012/0200943 A1   Aug. 9, 2012

(51) Int. Cl.
*G02B 3/00* (2006.01)
*G02B 9/00* (2006.01)
*G02B 5/32* (2006.01)

(52) U.S. Cl.
CPC .. *G02B 3/00* (2013.01); *G02B 5/32* (2013.01); *Y10S 359/90* (2013.01)
USPC .............................. 359/642; 359/796; 359/900

(58) Field of Classification Search
USPC ........................... 359/737, 642, 718, 796, 900
See application file for complete search history.

(56) References Cited

U.S. PATENT DOCUMENTS

| 4,957,663 | A | 9/1990 | Zwiers et al. |
| 2004/0135293 | A1 | 7/2004 | Umeki |
| 2008/0299340 | A1 | 12/2008 | Kamienski et al. |

FOREIGN PATENT DOCUMENTS

| WO | 2008020899 A2 | 2/2008 |
| WO | 2010139342 A1 | 12/2010 |

OTHER PUBLICATIONS

European Search Report issue in related European Patent Application 12154746.7 dated Jul. 3, 2012, 6 pages.
Response to European Search Report issue in related European Patent Application 12154746.7 filed Feb. 5, 2013, 18 pages.

*Primary Examiner* — Jack Dinh
(74) *Attorney, Agent, or Firm* — Lathrop & Gage LLP

(57) ABSTRACT

A lens, such as a lens for use in a wafer-level camera, is made by forming a polymeric material with at least one master to form a pre-final lens. The pre-final lens forms a majority of a final volume of the lens. The pre-final lens is allowed to harden, during which it may sag or shrink. An aliquot of polymeric material is added to the lens and formed with the same master with a spacer, or with a second master, to form a first surface layer that provides correction between the pre-final lens shape and a final desired lens shape. In an embodiment, the surface layer has similar or identical index of refraction to the pre-final lens. In an embodiment the lens is formed on a substrate. In an embodiment, a send master, or master pair, are used to form a lens having upper and lower curvature, with a second aliquot of polymeric material forming a second surface layer on a surface of the lens opposite to the first surface layer.

12 Claims, 16 Drawing Sheets

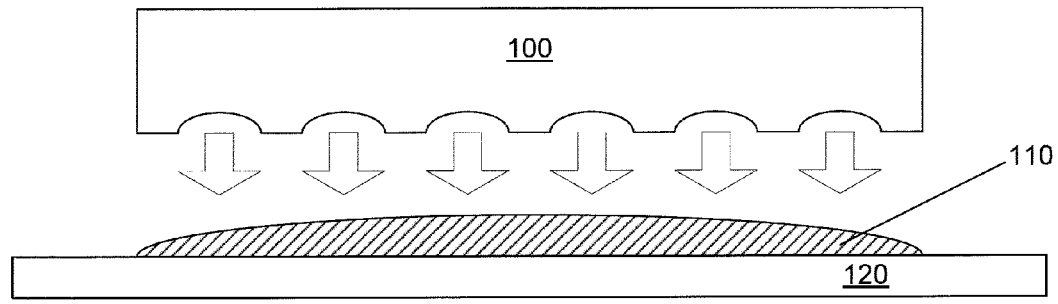
PRIOR ART    FIG. 1A
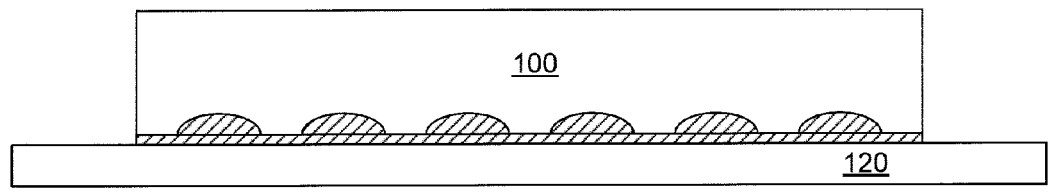
PRIOR ART    FIG. 1B
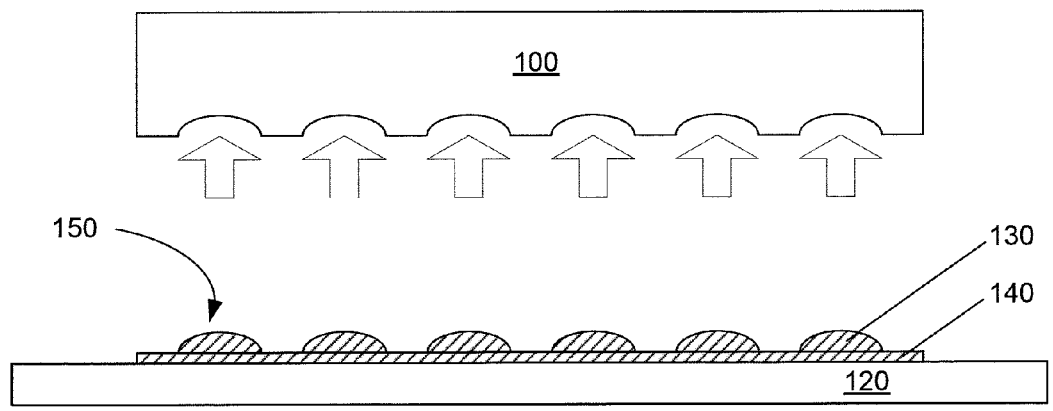
PRIOR ART    FIG. 1C

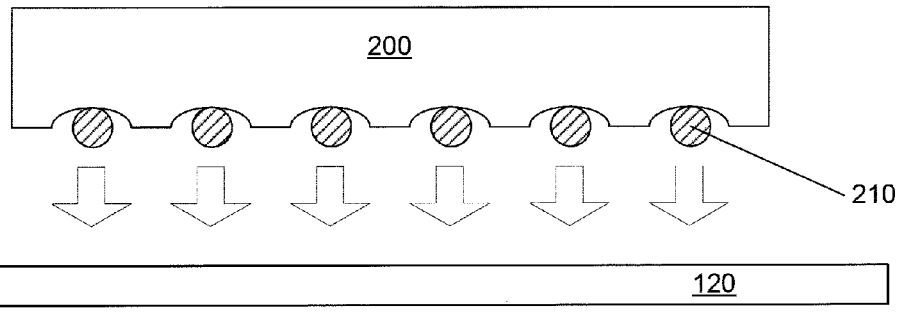
PRIOR ART    FIG. 2A
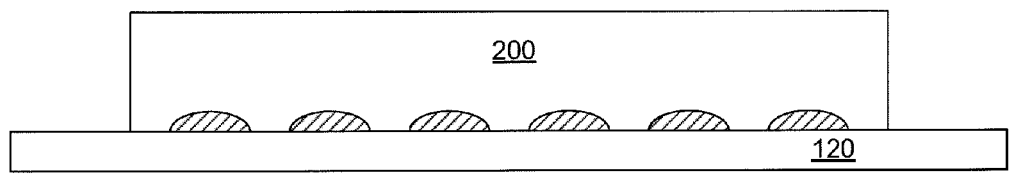
PRIOR ART    FIG. 2B
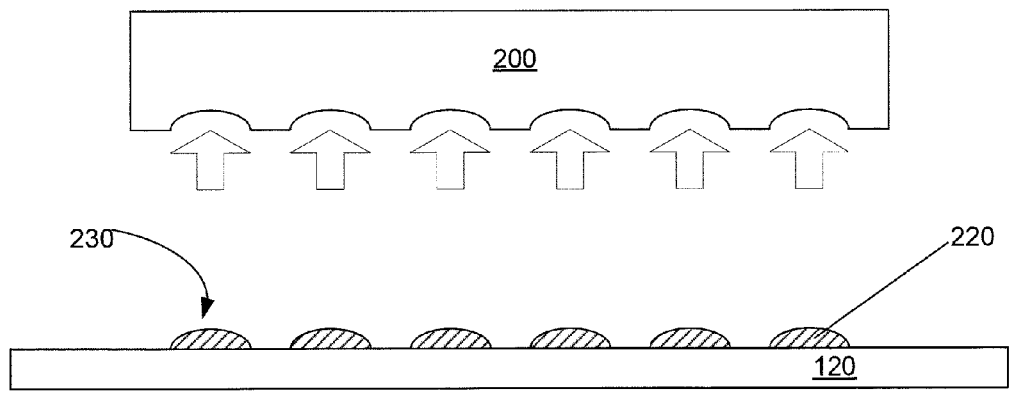
PRIOR ART    FIG. 2C

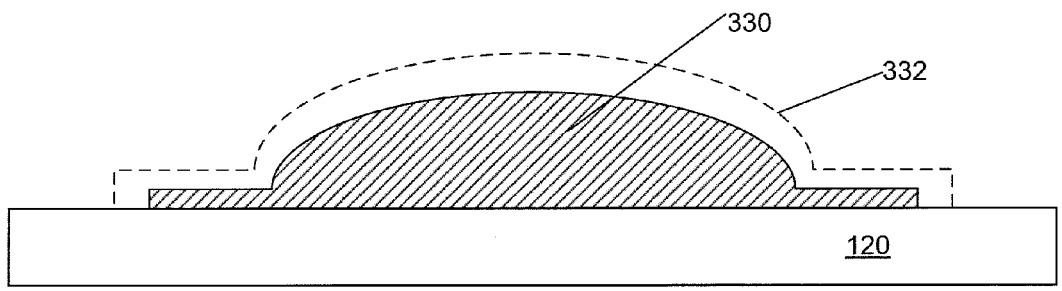
PRIOR ART    FIG. 3C
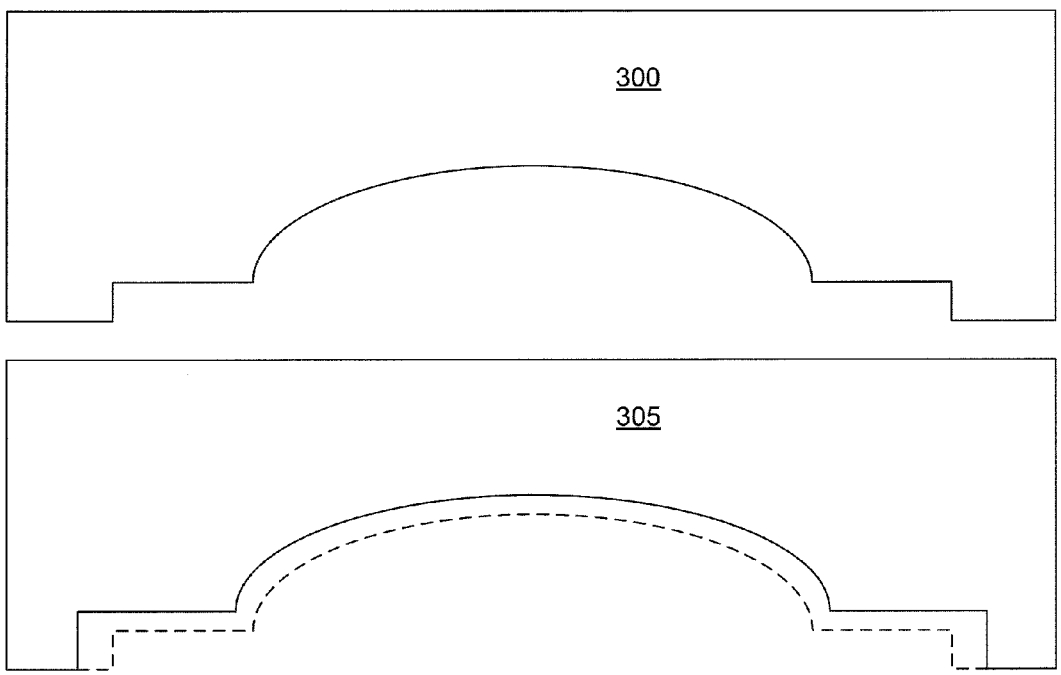
PRIOR ART
FIG. 3D

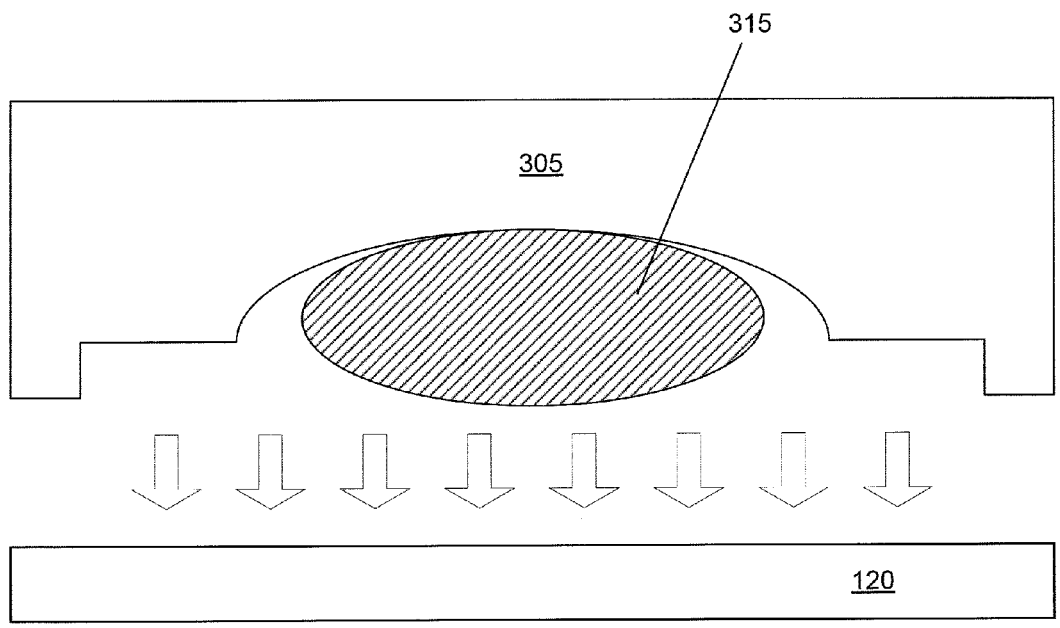
PRIOR ART FIG. 3E
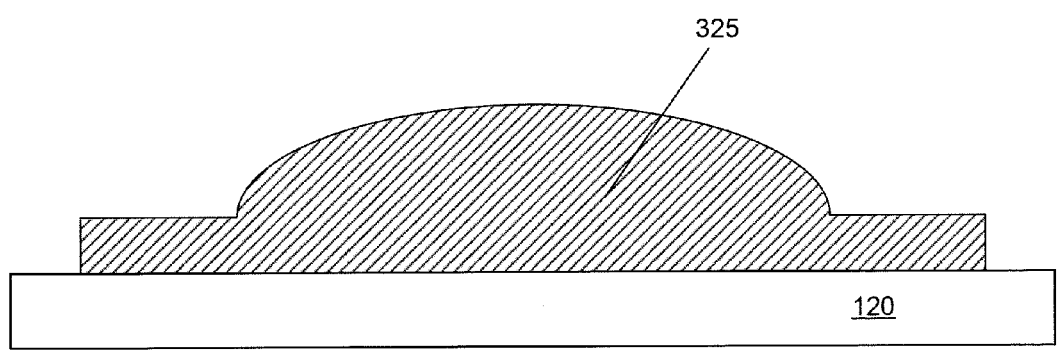
PRIOR ART FIG. 3F

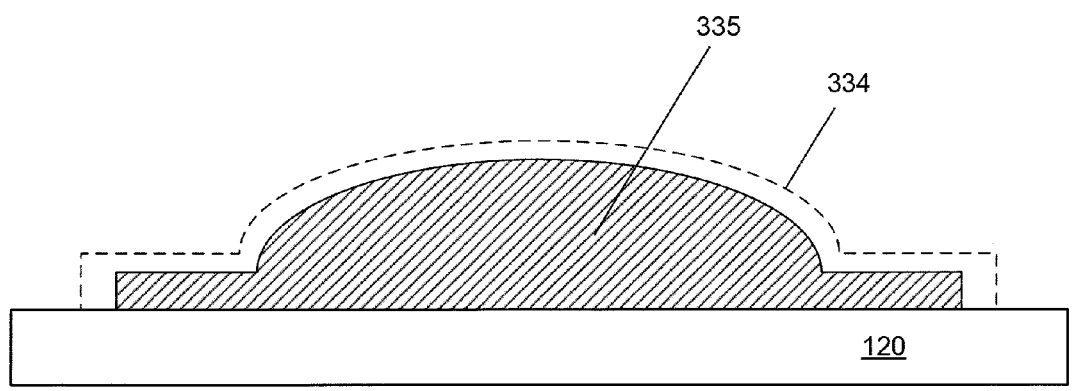
PRIOR ART   FIG. 3G
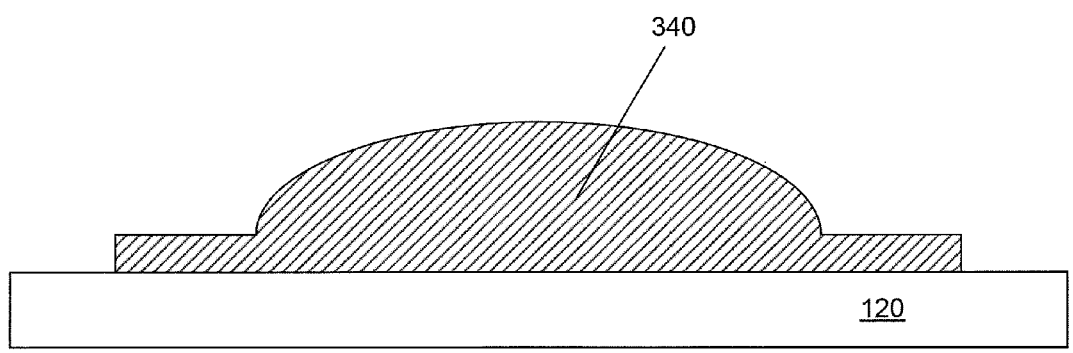
PRIOR ART   FIG. 3H

TWO-STAGE OPTICAL OBJECT MOLDING USING PRE-FINAL FORM

TECHNICAL FIELD

This disclosure relates generally to optical objects that are fabricated by molding, and in particular but not exclusively, relates to wafer level optical lenses that are molded with masters.

BACKGROUND INFORMATION

Mobile phones, PDAs, laptop computers and other electronic devices often contain imaging devices such as cameras assembled as wafer level optical devices. The main components of a wafer level camera typically include a lens assembly of one or more stacked lenses, and an underlying image sensor. Wafer level cameras are manufactured by wafer level packaging technologies that include processes such as fowling opto-wafers, aligning several layers of wafers, dicing, and finally packaging individual camera modules.

An opto-wafer contains a multitude of small individual lenses that are fabricated onto a substrate wafer, and may be manufactured with techniques such as using a master wafer, mold, or stamp, to reproduce lenses onto a substrate wafer. Each opto-wafer typically has multiple lenses and/or spacers; these wafers are cut during dicing such that each camera module typically inherits only one lens and/or spacers from each opto-wafer.

SUMMARY

A lens, such as a lens for use in a wafer-level camera, is made by forming a polymeric material with at least one master to form a pre-final lens. The pre-final lens is at least partially cured, during which it may sag or shrink. An aliquot of polymeric material is added to the lens and formed with the same master with a spacer, or with a second master, to form a first surface layer that provides correction between the pre-final lens shape and a final desired lens shape. In an embodiment, the surface layer has similar or identical index of refraction to the pre-final lens. In an embodiment the lens is formed on a substrate. In an embodiment, a send master, or master pair, are used to form a lens having upper and lower curvature, with a second aliquot of polymeric material forming a second surface layer on a surface of the lens opposite to the first surface layer.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 1A through 1C are cross sectional views showing the PRIOR ART process of lenses being formed on a substrate by a hard stamp.

FIGS. 2A through 2C are cross sectional views showing the process of lenses being formed on a substrate by a soft stamp.

FIGS. 3A through 3H are cross sectional views showing a trial and error process wherein a mold is modified in successive rounds to match the desired specs of the final lens product.

DETAILED DESCRIPTION OF THE EMBODIMENTS

Figure 3A:
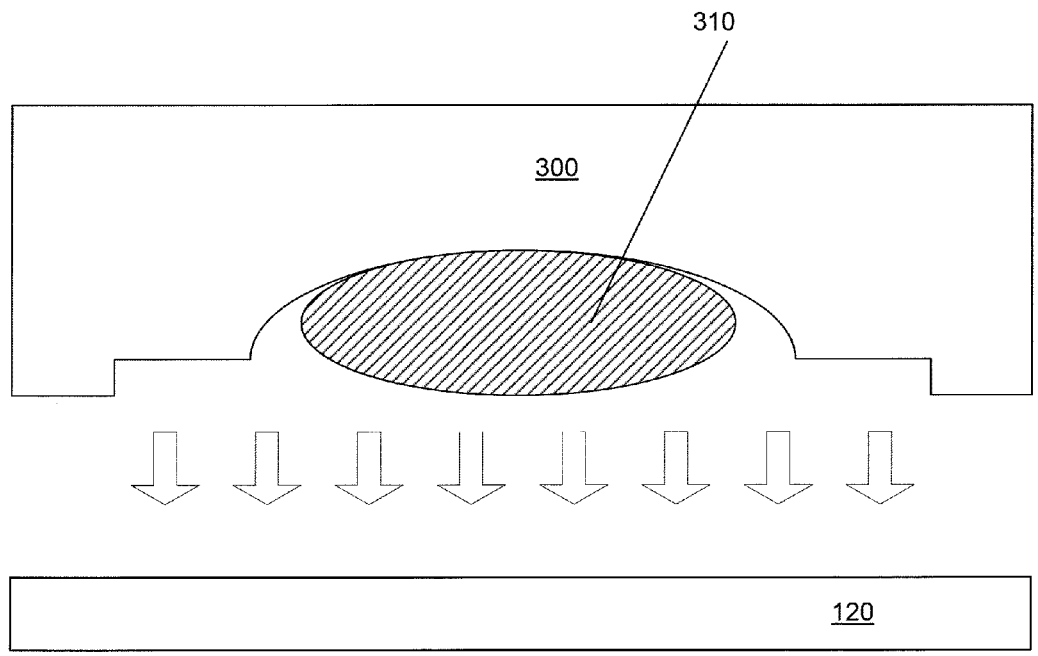

In the following description, numerous details and alternatives are set forth to provide a thorough understanding of the present invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics herein described may be combined in a suitable manner in one or more embodiments.

Lens replication for volume production of wafer-level optical systems may be done by replication techniques such as molding. In one example, the master is a hard stamp. As shown in FIG. 1A, a hard stamp 100, such as one made from glass or steel, presses down upon a droplet of replication material 110, such as an UV-curable polymer, that has been previously dispensed on a substrate wafer 120. Replication material 110 may also be a resin cured with a catalyst, or a heated thermoplastic. As the hard stamp 100 squeezes down on the polymer, the polymer conforms to the master, as shown in FIG. 1B, and is cured into a solid state by means such as UV light exposure, heat, or a catalyst. In FIG. 1C, the hard stamp 100 parts from the substrate wafer 120, leaving behind a lens layer 150 comprising individual formed lenses 130. If an excess of replication material 110 is provided, a residual layer 140 may also be present beneath the formed lenses. In another example, the master is a soft stamp. FIG. 2A shows a soft stamp 200 that may be made from silicone rubbers such as polydimethylsiloxane ("PDMS"). Replication material 210, such as UV epoxy polymer, is dispensed onto the soft stamp 210. FIG. 2B shows the soft stamp 210 pressing down upon the substrate wafer 120, transferring the polymer 210 onto the substrate wafer 120, and casting the polymer 210 into lens. The polymer 210 is cured into a solid state by means such as UV exposure. Parting of the soft stamp 200 from the substrate wafer 120 leaves behind a lens layer 230 having multiple individual lenses 220, as shown in FIG. 2C.

After a lens is molded, it may experience shape change while its polymer cures, an example of which is shrinkage or sagging. Shrinkage is related to curing properties of the lens material, such as epoxy. Shape change such as shrinkage results in a lens product that deviates from the shape of the stamp, and which may deviate from intended lens design specifications.

Several methods may be used to remedy the undesirable shrinkage effect. In one approach, shrinkage is compensated for by using a mold, such as hard stamp 100 that has a shrinkage-compensated shape to produce a pre-shrunk, oversized, lens that is slightly larger than the desired goal. The hope is that as the oversized lens shrinks to a smaller size, the final form will meet the intended lens design specifications. This approach is a trial-and-error process that is often cumbersome because, among other reasons, shrinkage is sometimes not exactly as predicted and may vary with temperature and precise material composition.

Figure 3B:
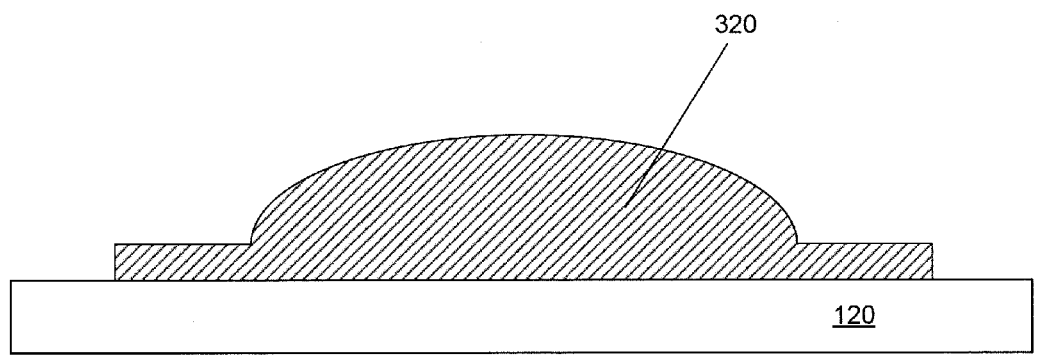

FIGS. 3A through 3H illustrate an example of this prior-art process. A first trial master 300 is made to include a cavity that matches shape of the intended lens. The first trial master 300 is used to cast a polymer 310 onto a substrate 120, as shown in FIG. 3A, to form a first trial lens 320, as shown in FIG. 3B. As the first trial lens 320 solidifies, cures, and stabilizes, it shrinks from its initially molded dimensions 332 to a first smaller lens 330, as shown in FIG. 3C. Comparing the first smaller lens 330 with intended lens specifications enables an engineer to estimate the extent to which the cavity of the first trial master 300 needs to be enlarged in order to produce a second trial master 305, as shown in FIG. 3D; the first trial lens is then discarded. Then, in a separate molding operation, the second trial master 305 is used to cast a larger amount of polymer 315 onto the substrate 120, as shown in FIG. 3E, thereby forming a second trial lens 325, as shown in FIG. 3F. The second trial lens 325 eventually shrinks from its initially molded dimensions 334 to a second smaller lens 335, as shown in FIG. 3G, during curing if it is formed from a UV cured polymer or a catalytically cured epoxy polymer, or during cooling if it is formed from a thermoplastic. Hopefully this second smaller lens 335 is sufficiently close to the intended lens specifications. If not, then this iterative trial-and-error process will continue, until a final lens product 340 that sufficiently resembles the intended lens shape is produced, as shown in FIG. 3F. Two, three, or more rounds of mold machining are often required to eventually produce a final master that can be used to mold a lens that meets the lens design specifications.

Figure 4A:
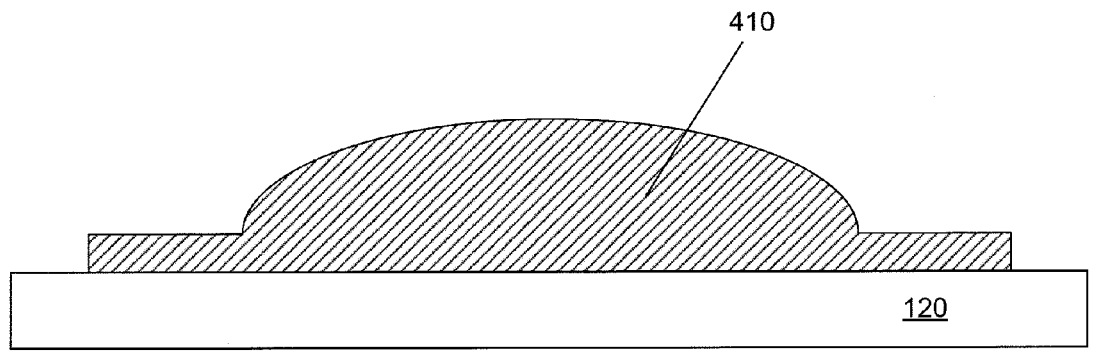
FIGS. 4A and 4B are cross sectional views showing a process wherein a lens is cast in two molding operations, each using its own master, to produce a desired final lens product.

We propose a process that allows avoidance of the trial-and-error, iterative, process, while producing a final lens-on-flat-substrate by using two or more successive and additive molding operations. In one embodiment, two masters are used to cast a lens on a flat substrate. In a first molding operation, the first master, alternatively known as the blob mold, and as illustrated in FIG. 4A, is used to cast onto substrate 120 a first lens, which is then at least partially cured, during curing it is allowed to shrink. After shrinking, the first lens becomes a pre-final lens 410, alternatively known as a blob 410. The amount of lens material that is used for the blob 410 typically constitutes most, but not all, of total material that is expected to be used for the final lens. For example, in an embodiment, approximately 95% to 99% of the intended total of lens material is used to cast the blob 410. Once cast, the blob is cured sufficiently that most or all shrinkage the blob will undergo occurs. Since the blob contains most of the total material of the final lens, most of the bulk or large scale shrinkage effects of the blob have happened in the blob 410 when this curing step is complete.

The blob 410 may closely approximate the intended design specs of the desired final lens. For example, the blob 410 may have dimensional measurements that are up to 10 micrometers smaller than those of the desired final lens.

Figure 4B:
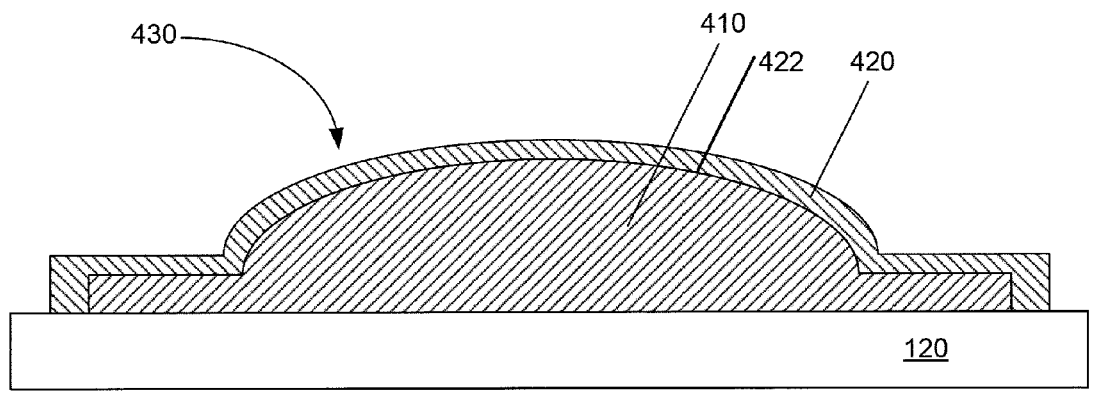

Following shrinkage of the blob 410, the second master is used in a second molding operation to transfer a thin layer of additional polymer 420 onto the blob 410, as shown in FIG. 4B. The second master, alternatively known as the lens mold, may have the exact lens shape as the desired final lens, or in an alternative embodiment may include a small modification for shrinkage compensation vis-à-vis the desired final lens. The amount of additional material transferred onto the blob 410 during the second molding operation may be, for example, approximately 1% to 5% of the total amount of lens material, the sum of blob material and additional material being approximately 100% of the lens material of the finished lens. Due to the small amount of lens material that is used to cast the thin layer 420, this thin layer 420 only experiences slight shrinkage relative to final lens shape. While the material of thin layer 420 may be the same or a similar material to that of the blob, because shrinkage in a particular dimension is proportional to the amount of material present and thin layer 420 is much thinner than the blob, shrinkage of the thin layer represents a smaller change in overall lens dimensions than would shrinkage of an entire lens. The shrinkage effects of thin layer 420 on final shape of the thin layer 420 are therefore significantly reduced from those of the blob, and the thin layer backfills and compensates for shrinkage of the blob. As a result, the final lens 430, comprising the blob 410 and the thin layer 420, should be sufficiently close to the designed shape of the desired final lens shape to meet lens design specifications.

Due to the several separate and additive molding operations, an interface may exist between the blob 410 and the thin layer 420. To prevent distortion, reflections, or scattering from such an interface, the blob 410 and the thin layer 420 may be made of the same lens material, or a material with the same or similar optical indices including the index of refraction as the blob 410. In an alternative embodiment thin layer material 420 has lower viscosity than blob material but the same or similar index of refraction to enable easy molding of the thin layer 420. In an embodiment, thin layer material 420 is the same material as blob 410 and has the same index of refraction, in another embodiment it has a difference in index of refraction from blob 410 within 5% of that of blob 410, and in an alternative embodiment a difference in index of refraction within 10%. In an embodiment, thin layer 420 adheres directly to blob 410 with no need for an interfacial layer, and has an index of refraction sufficiently close to that of the blob 410 that essentially no refraction occurs at a boundary 422 of thin layer 420 to blob 410. In alternative embodiments, an interfacial substance such as an index matching and bonding material may be dispensed at the potential interface, at the boundary 422 between thin layer 420 and blob 410. In addition or as an alternative, following the casting of the thin layer 420, additional process steps may be employed so as to mitigate any possible interface effect. For example, a reflow step may be used to diminish the interface between the blob 410 and the thin layer 420 by blending the materials of blob and thin layer at the interface, such that some of thin layer 420 merges into and thickens blob 410.

Figure 5A:
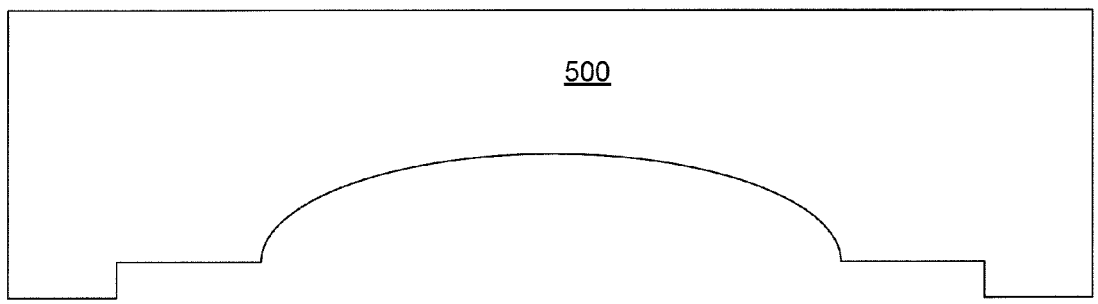
FIGS. 5A through 5D are cross sectional views showing a process wherein a lens is cast in two molding operations with essentially the same master to produce a desired final lens product.
Figure 5B:
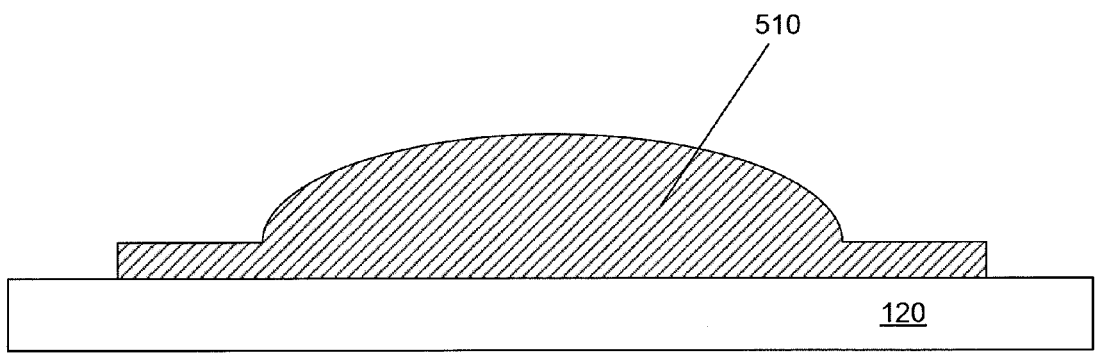
Figure 5C:
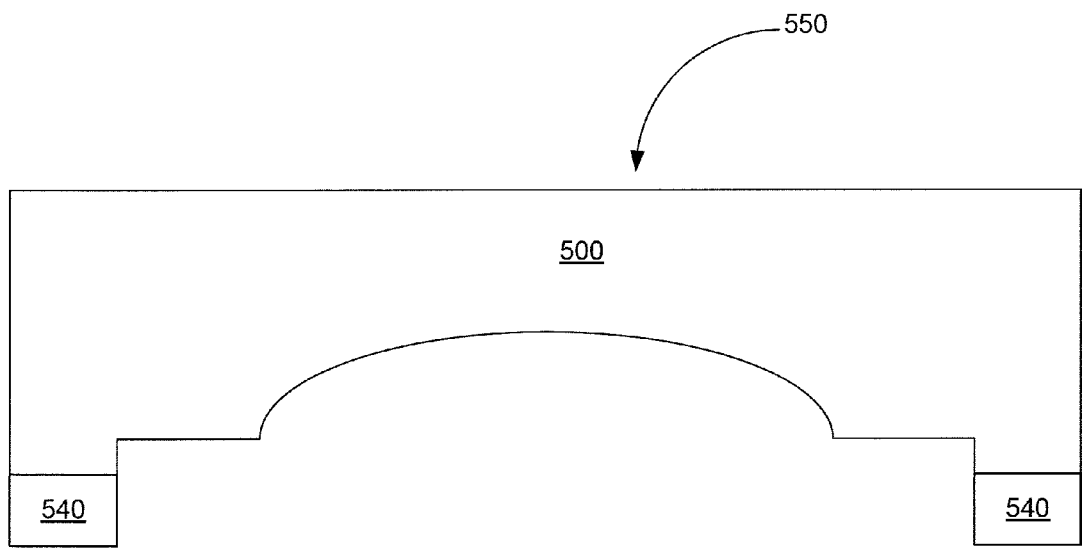
Figure 5D:
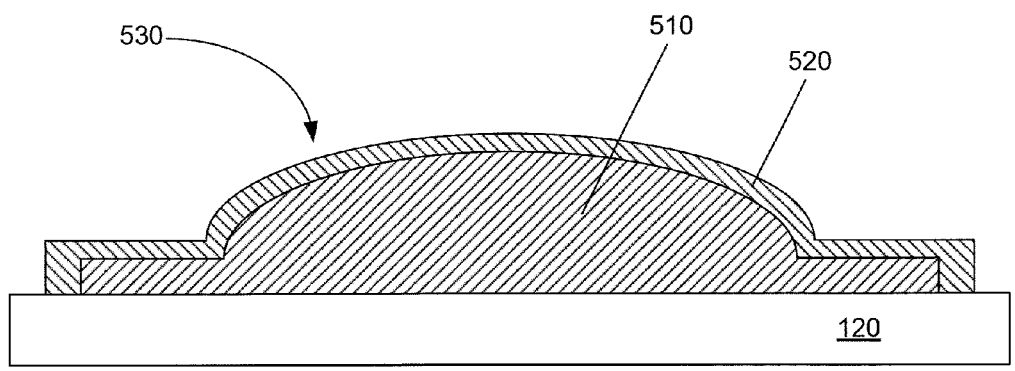

In certain situations, such as when a PDMS soft stamp is used for casting, a lens cast on a flat substrate may experience shrinkage primarily in the vertical direction. In addition, the compressible, rubber-like, nature of PDMS may also contribute to shrinkage and deformation. In another embodiment wherein two or more successive, additive, molding operations are used to produce a lens-on-flat-substrate, a first master 500, as shown in FIG. 5A, is used to cast a pre-final lens or blob 510 onto a substrate 120, as shown in FIG. 5B. A second master 550 is constituted by adding one or several spacers 540 to the first master 500, as shown in FIG. 5C. The second master 550 is used to transfer a thin layer 520 onto the blob 510, as shown in FIG. 5D. In many embodiments, the final lens shape 530 of blob 510 plus thin layer 520 is sufficiently close to the intended design specs of the desired final lens shape as to need no further compensation; if correction is required the magnitude of subsequent master revisions is much reduced from that required with the prior lensmaking procedures.

Figure 6A:
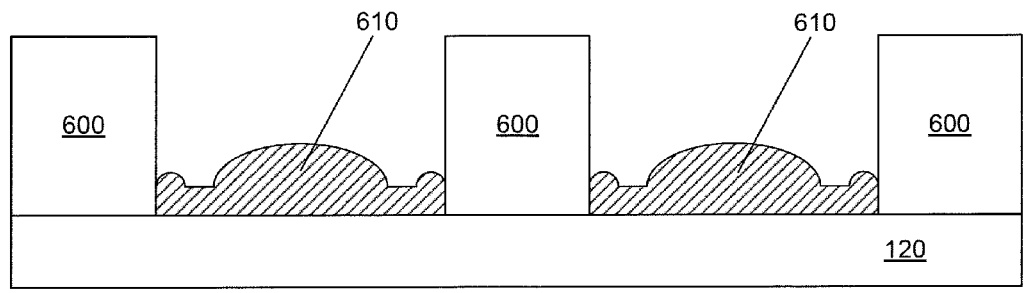
FIGS. 6A and 6B are cross sectional views showing embodiments of a lens-in-pocket form and a suspended lens.
Figure 6B:
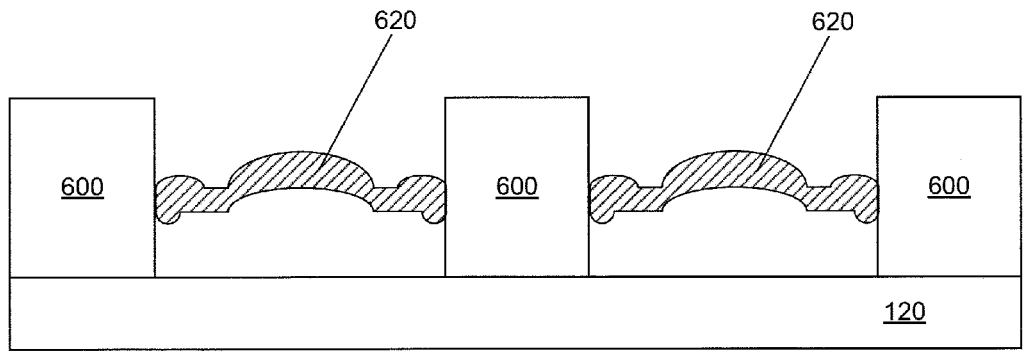

Alternative lens forms exist in addition to the lens-on-flat-substrate form as disclosed above. For example, in an alternative embodiment, a lens having a lens-in-pocket form, such as where spacers 600, positioned between lenses 610, are situated on a substrate 120, and as shown in FIG. 6A may be fabricated. In another example, a suspended lens 620 may be fabricated, such as where lens 620 is positioned between and elevated with respect to spacers 600, as shown in FIG. 6B.

Figure 7A:
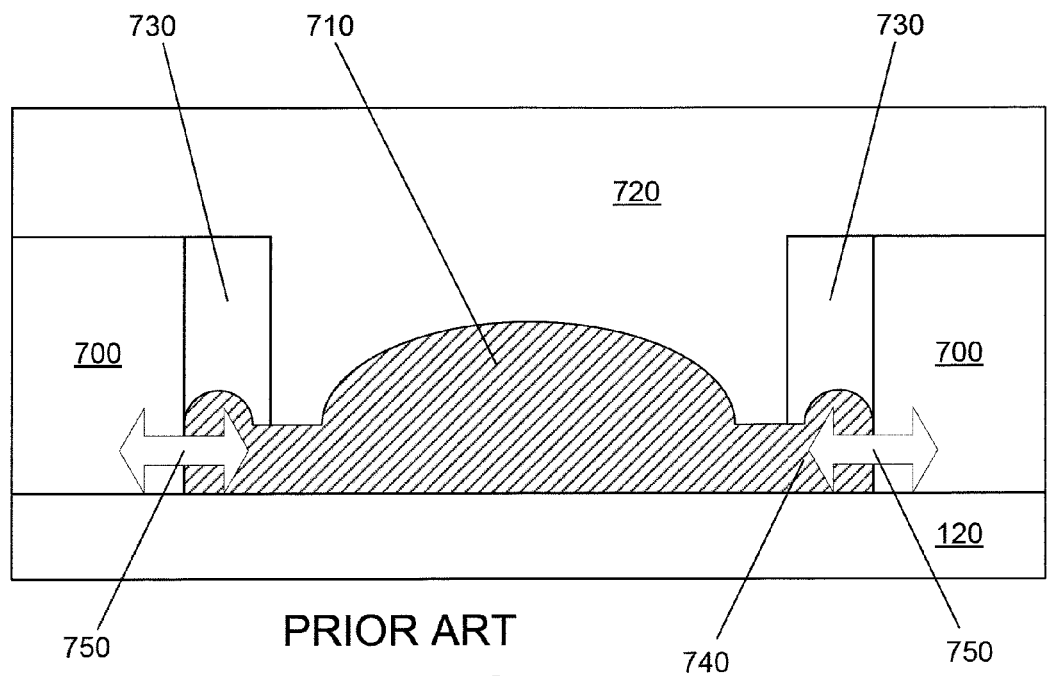
FIGS. 7A and 7B are cross sectional views showing prior art embodiments of a convex lens-in-pocket and a concave lens-in-pocket, respectively.

Lens-in-pocket or suspended lenses may present additional challenges to control lens deformation because of forces like lateral stresses from the side wall of the spacers, as illustrated in FIG. 7A. Master 720 is used to cast a convex lens-in-pocket form 710 onto a substrate 120, where convex lens-in-pocket form 710 is bounded by spacers 700. Voids 730 serve as overflow space that permits the side 740 of the lens to overflow. Forces such as the lateral stress 750 may make it difficult to predict shrinkage compensation, and impair process repeatability when shrinkage-compensated molds, such as that of FIG. 3E, are used. For example, in addition to a vertical deformity or shrinkage, the lateral stress 750 may induce a lateral deformity or shrinkage, which may be restrained by spacers 700 thereby causing further lens deformations.

Figure 7B:
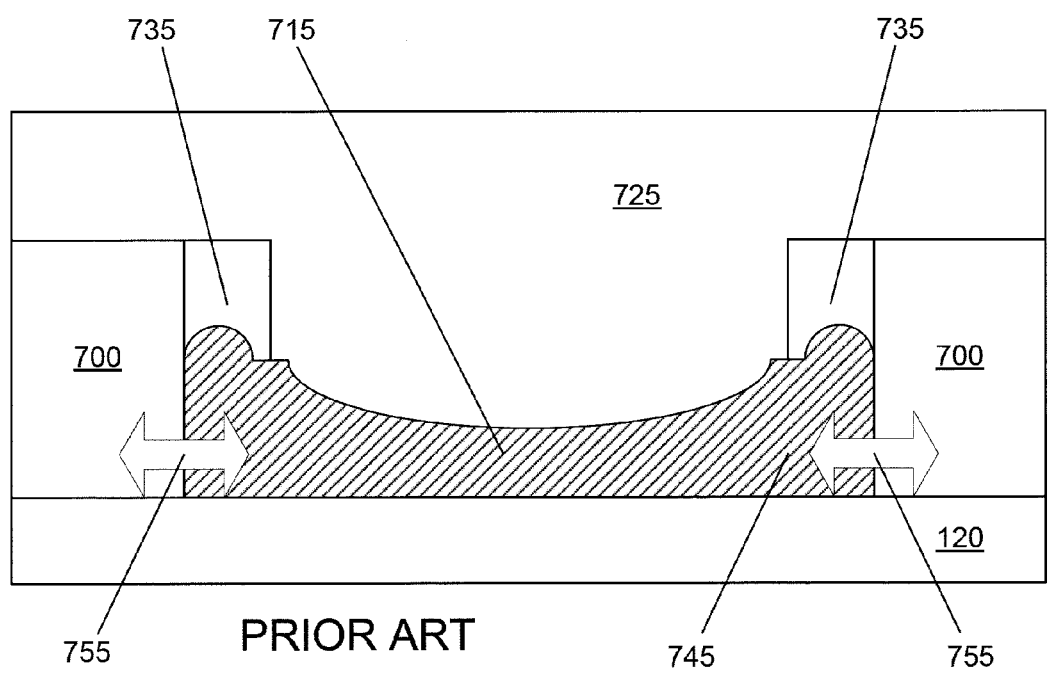

In addition to the effect of lateral stress from spacers 700, the extent to which the overflowed lens material at the lens side 740 bulges into the voids 730 may exacerbate the lateral stress 750. An example that illustrates this phenomenon is shown in FIG. 7B. Here, a master 725 is used to cast onto a substrate 120 a concave lens-in-pocket form 715 which is bounded by spacers 700. Voids 735 at periphery of master 725 serve as overflow space that permits the side 745 of the lens to overflow as well as allowing for minor misalignments of master 725 to substrate 120. Forces such as lateral stress 755 may make it difficult to control shrinkage compensation. A concave embodiment may have more pronounced lateral stress effects than many convex embodiments. In part due to gravity, the overflowed lens material at the lens side 745 may magnify the lateral stress 755, and may potentially cause significant lateral deformity or shrinkage. Further, if there are variations in the amount of the lens material such that there is a variation in the amount of the overflowed lens material 745, then the level of difficulty of compensating for shrinkage may be increase, in part due to possible variations in vertical and/or lateral deformations or shrinkages.

Figure 8A:
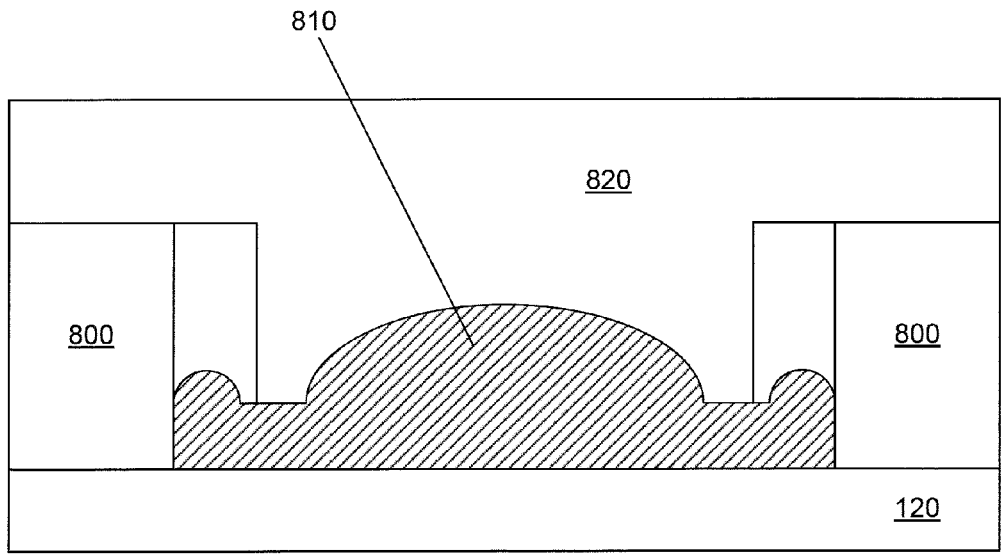
FIGS. 8A through 8C are cross sectional views showing a process of casting a lens-in-pocket with two masters and a process of casting a lens-in-pocket with a combination of one master and one or several vertical spacers.
Figure 8B:
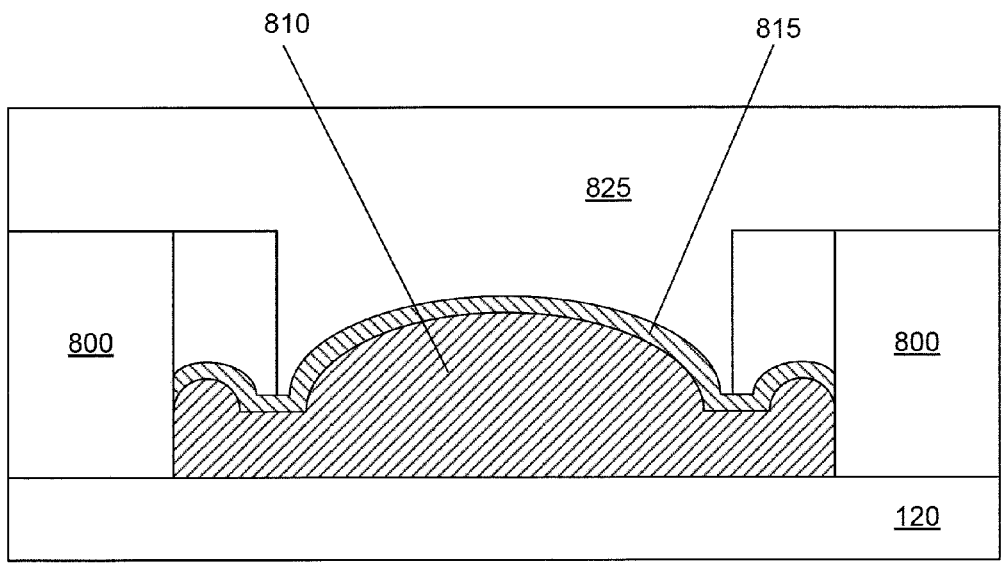
Figure 8C:
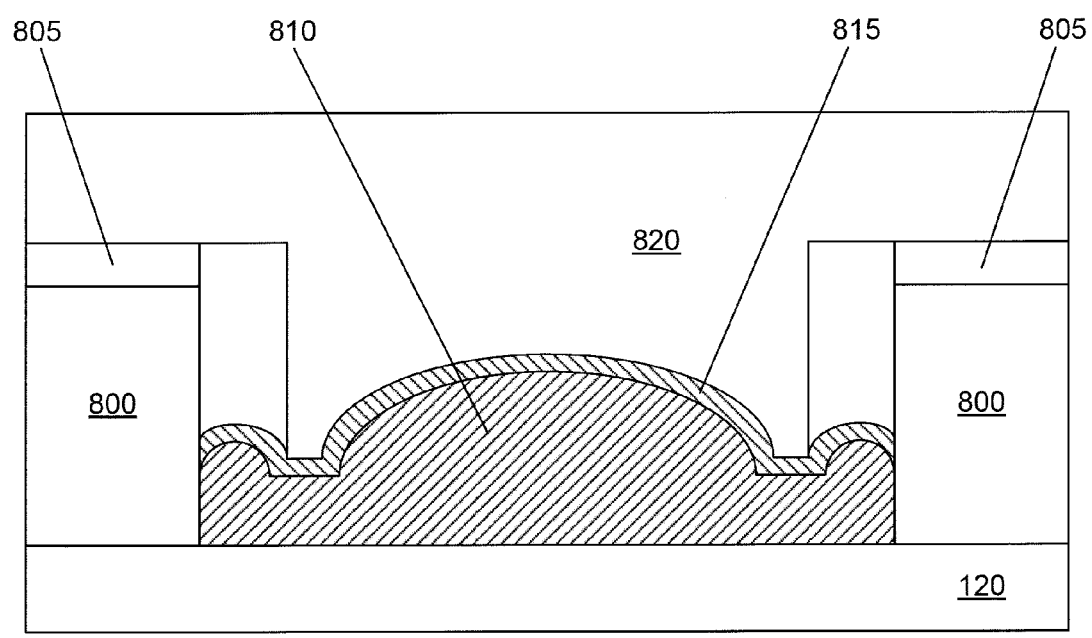

Several embodiments of our process for forming a lens-in-pocket form are disclosed herein. In one embodiment, as shown in FIG. 8A, a first master, such as a soft PDMS master 820, is used to cast a pre-final lens 810 onto a substrate 120, with the pre-final lens 810 being bounded by spacers 800. After the pre-final lens 810 has experienced shrinkage and hardened, a second master, such as a soft PDMS master 825, is used to transfer a small amount of lens material onto the pre-final lens 810, thereby forming a thin layer 815, as shown in FIG. 8B. In another embodiment, after the pre-final lens 810 has been casted by the master 820 as shown in FIG. 8A, vertical spacers or shims 805 (FIG. 8C) are added to spacers 800. Then the same master 820 is re-used with some additional lens material to form a thin layer 815 onto the pre-final lens 810, as shown in FIG. 8C; the vertical spacers or shims 805 operate to control thickness of the thin upper layer 815.

Structural and operational parameters for the lens-in-pocket form are similar to those of the lens-on-flat-substrate form. For example, the pre-final lens 810 may constitute approximately 95% to 99% of the entire amount of lens material; since shrinkage is typically proportional to volume most of the shrinkage or deformation effect occurs prior to adding thin layer 815. In another example, the pre-final lens 810 may have dimensional measurements that are up to ten micrometers less than those of the desired final lens shape, thereby closely approximating the desired final lens shape. Yet in another example, an interface may exist between the pre-final lens 810 and the thin layer 815, and the interface may produce surface related errors, such as light distortion, refraction and reflection at the interface. Accordingly, the pre-final lens 810 and the thin layer 815 may be made from the same lens material, or a different material with the same or similar optical refractive index, in order to reduce or eliminate reflection and refraction at the interface. Further, an interfacial substance such as an index matching material may be dispensed at the potential interface. Following the casting of the thin layer 815, an additional process step, such as a reflow step, may be employed so as to mitigate interface effects by blending the thin layer 815 into blob 810.

Figure 9A:
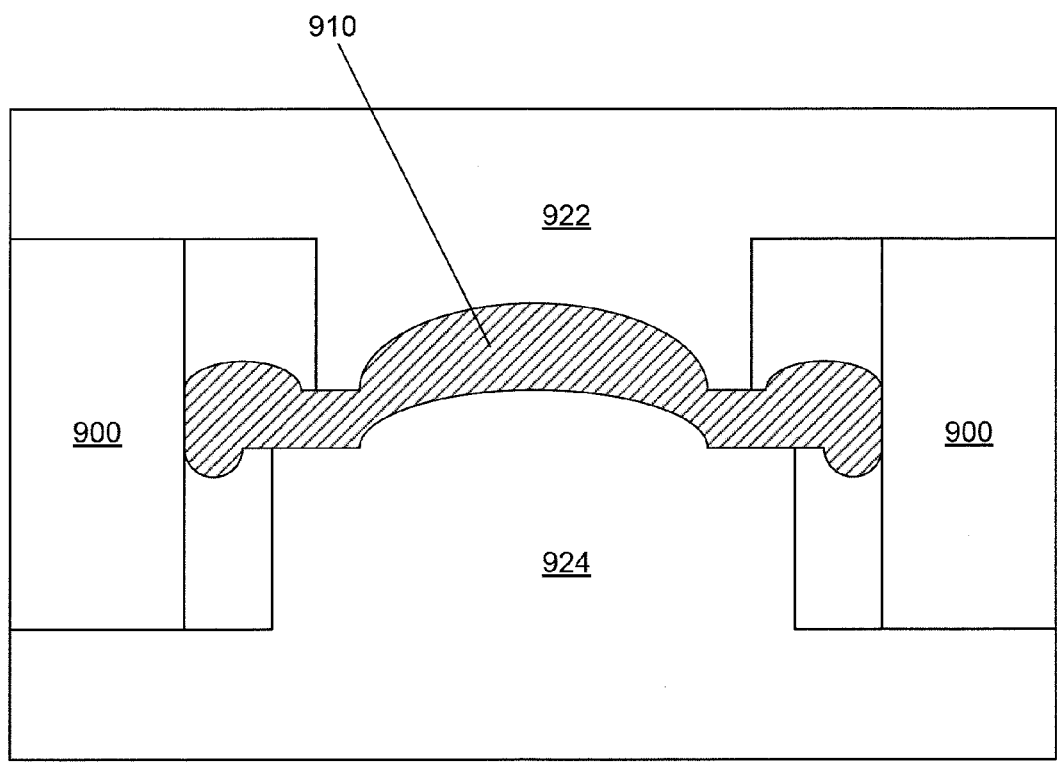
FIGS. 9A through 9C are cross sectional views showing a process of casting a suspended lens with two sets of masters and a process of casting a suspended lens with a combination of one set of masters and one or several vertical spacers.
Figure 9B:
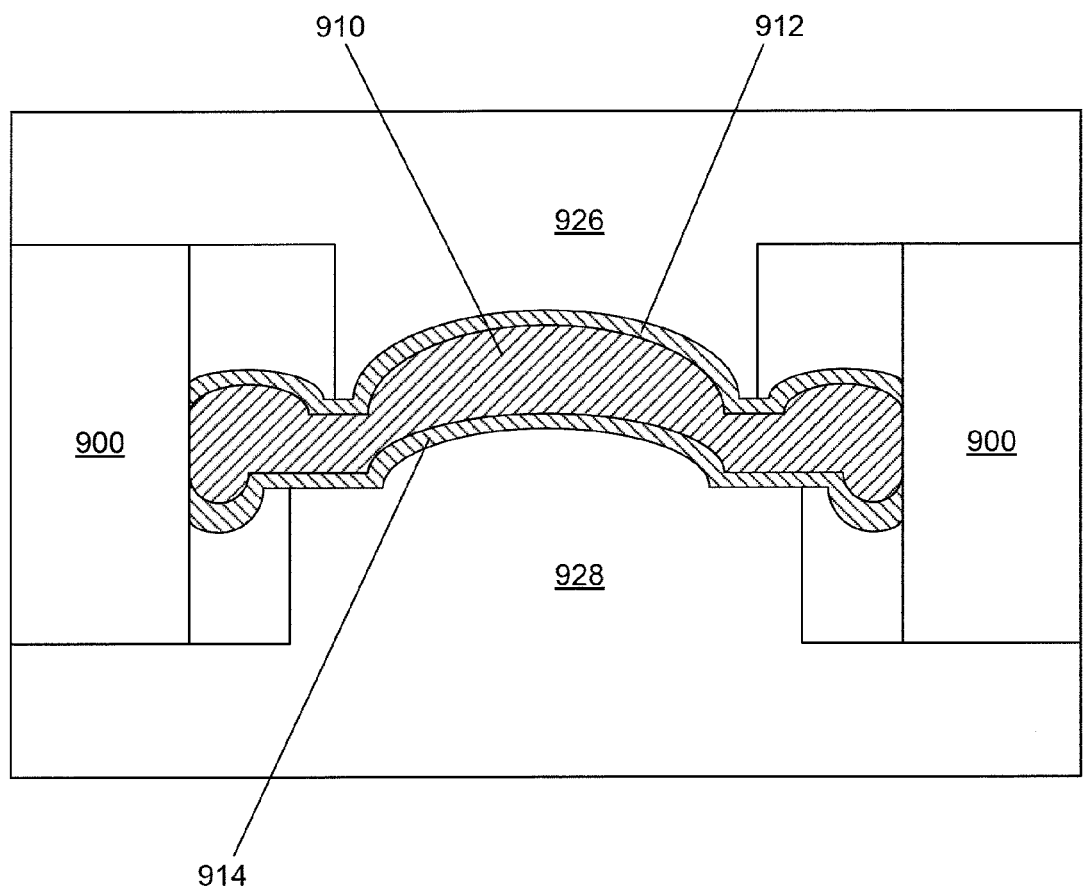
Figure 9C:
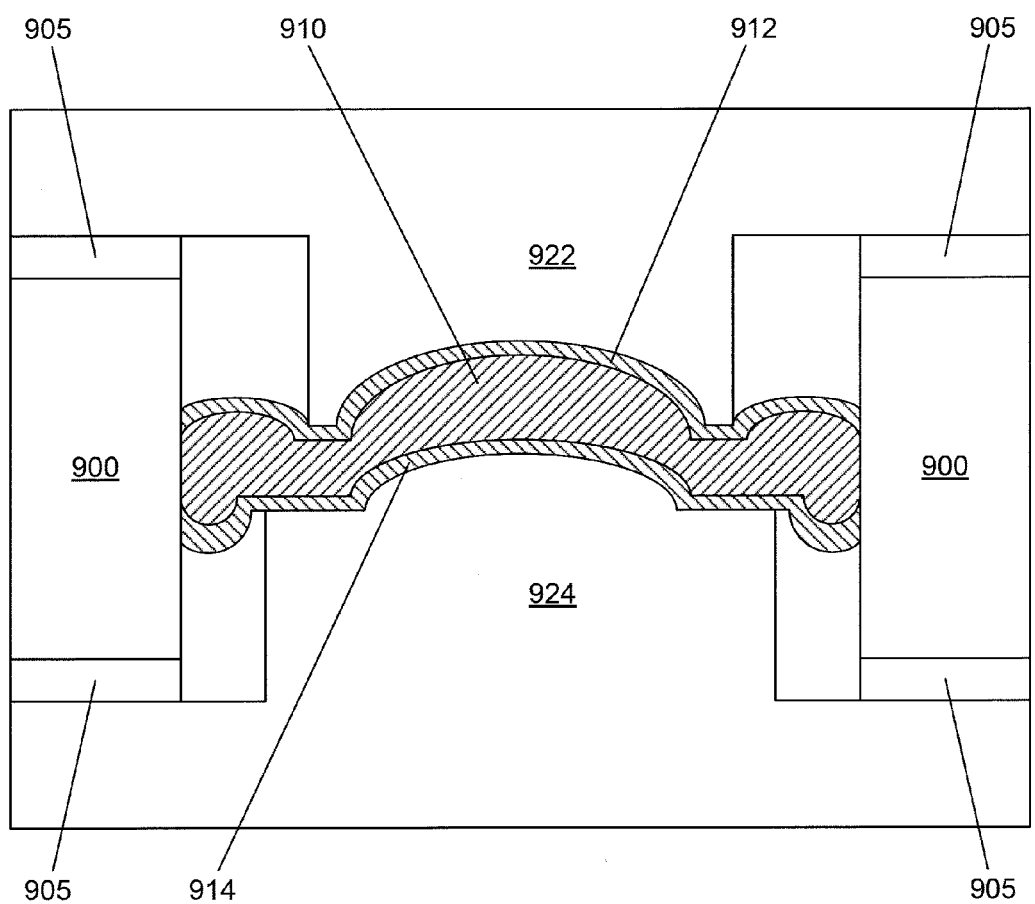

A suspended lens, similar to the lens-in-pocket form, is bounded by spacers. On the other hand, for a suspended lens, both the upper surface and the lower surface need molds while the lens is casted. Several embodiments regarding the suspended lens are disclosed herein. In one embodiment, as shown in FIG. 9A, a first upper master 922 and a first lower master 924 are used to cast a pre-final lens 910 while being bounded by spacers 900. After the pre-final lens 910 has experienced shrinkage, a second upper master 926 (FIG. 9B) and a second lower master 928 may each be used to transfer a small amount of lens material onto the upper surface and the lower surface of the pre-final lens 910, thereby forming a thin upper layer 912 and a thin lower layer 914. In another embodiment, after the pre-final lens 910 has been casted by the upper master 922 and the lower master 924, as shown in FIG. 9A, vertical spacers or shims 905 (FIG. 9C) are added to top and bottom of the spacers 900. Then the same upper master 922 and the same lower master 924 as used for initial molding of the pre-final form are used to form the thin upper layer 912 and the thin lower layer 914 onto the pre-final lens 910, as shown in FIG. 9C; the vertical spacers 905 operate to control thickness of the thin upper layer 912 and the thin lower layer 914.

Structural and operational parameters for suspended lenses are similar to those of the lens-in-pocket form. For example, the pre-final lens 910 may constitute approximately 95% to 99% of the entire amount of lens material, thereby most of the shrinkage or deformation effect is in the pre-final lens. In another example, the pre-final lens 910 may include dimensional measurements that are up to 10 micrometers less than those of the desired final lens shape, thereby closely approximating the desired final lens shape while allowing for additional material.

Yet in another example, an interface may exist between the pre-final lens 910 and the upper and low thin layers 912 and 914, and this interface may produce surface related errors, such as light distortion, as previously discussed with reference to the lens-in-pocket form. Interface effects can be reduced or eliminated by using the same lens material, or material with the same or similar optical indexes, for both the pre-final lens 910 and the thin upper and lower layers 912 and 914. Further, an interfacial substance such as an index matching material may be dispensed at the potential interface. In addition or as an alternative, following the casting of the thin upper and lower layers 912 and 914, a reflow or other process step may be employed so as to mitigate the possible interface effect by blending thin upper and lower layers 912, 914 with material of the pre-final lens 910 at the interface.

It should be noted that the method of forming lenses herein described is adaptable to forming lenses of concave, convex, spherical, or aspherical form; the shape of the resulting lenses is determined by shape of the masters used for forming the lenses.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of forming a lens, comprising:
   using a first set of masters, molding at least a top surface of a pre-final lens of a material that shrinks after forming;
   applying first additional lens material above the pre-final lens;
   using a second set of masters, molding the first additional lens material into at least a top layer on top of the pre-final lens, thereby forming a final lens;
   wherein the pre-final lens forms a majority of a final volume of the final lens, and
   wherein the pre-final lens includes a deformity due to shrinkage of the pre-final lens after molding the pre-final lens, and wherein the top layer substantially corrects the deformity.

2. The method of forming a lens of claim 1,
   wherein the first set of masters differs from the second set of masters in at least one master of the first set having different shape from a corresponding master in the second set.

3. The method of claim 2, wherein molding at least a top surface of the pre-final lens comprises forming the top surface of the pre-final lens on a flat substrate.

4. The method of claim 2, wherein molding at least a top surface of the pre-final lens comprises forming the top surface of the pre-final lens between spacers.

5. The method of claim 2, further comprising forming a bottom layer beneath the pre-final lens.

6. The method of claim 2 wherein the second set of masters comprise a combination of the first set of masters and a spacer.

7. The method of forming a lens of claim 1, further, comprising:
   applying second additional lens material beneath the pre-final lens; and
   wherein the step of using a second set of masters, molding the first additional lens material into at least a top layer on top of the pre-final lens includes molding the second additional lens material into a bottom layer beneath the pre-final lens.

8. The method of claim 7, wherein molding the top layer and the bottom layer comprise forming the top and bottom layers of a material that shrinks after molding.

9. The method of forming a lens of claim 1,
   wherein the second set of masters is formed by adding at least one spacer to the first set of masters, and wherein a thickness of the spacer controls a thickness of the top layer.

10. A method of claim 9, wherein using the first set of masters to form the pre-final lens comprises forming the pre-final lens on a flat substrate.

11. The method of forming a lens of claim 1, further comprising:
    wherein, the step of using a first set of masters, molding at least a top surface of the pre-final lens includes molding a bottom surface of the pre-final lens,
    inserting at least one spacer between a top master and a bottom master of the first set of masters to form the second set of masters,
    applying second additional lens material between the pre-final lens and the bottom master of the first set of masters, and
    wherein, the step of using a second set of masters, molding at least a top layer at the top of the pre-final lens further comprises molding the second additional lens material into a bottom layer beneath the pre-final lens;
    wherein the pre-final lens forms a majority of a final volume of the lens.

12. The method of claim 1 wherein the pre-final lens forms at least 95% of the final volume of the final lens.

* * * * *